Patented June 15, 1926.

1,588,466

UNITED STATES PATENT OFFICE.

EDVARD POULSSON, OF OSLO, NORWAY.

BENZOYL-ECGONINE ESTER AND PROCESS OF PRODUCING THE SAME.

No Drawing. Application filed May 12, 1924, Serial No. 712,865, and in Norway May 15, 1923.

The present invention relates to the production of benzoylecgonine esters and has for its object certain novel chemical compounds of this group as well as a process for the production of these novel compounds. The invention also comprises these novel benzoylecgonine esters as the partial or sole constituents of anæsthetics more especially of local anæsthetics.

The esters forming one of the objects of this invention are the benzoylecgonine esters with radicals of hydrocarbons in which the number of hydrogen atoms in relation to carbon atoms is less than in hydrocarbons of the methane series more especially aromatic hydrocarbon radicals and radicals of unsaturated hydrocarbons.

The esters are produced by substituting a hydrogen atom of a carboxyl group in the ecgonine molecule with a radical of the character above referred to and substituting a hydrogen atom of a hydroxyl group in the ecgonine molecule with benzoyl.

The introduction of the aromatic or unsaturated hydrocarbon radical in the ecgonine molecule may be effected in various manners before or after the introduction of the benzoyl radical. To attain the desired result it would appear to be the most obvious method to pass dry hydrochloric acid gas into a solution of benzoylecgonine in the alcohol corresponding to the radical to be introduced, which is the method usually followed in the production of the methyl ester of ecgonine, that is cocaine.

It has been found by experiments, however, that this method as usually carried into effect cannot with advantage be directly applied for the commercial production of the benzoylecgonine esters comprised by the present invention. This is more especially the case in connection with the introduction of the benzyl radical and of the allyl radical in the benzoylecgonine molecule.

A suitable method for the commercial production of the novel esters consists in the application of an alkylating method suggested by W. Merck in the year 1885 (Ber. 18, 2953) and which consists in treating the benzoylecgonine with alkyl halides.

By the application of this esterification method to the compounds referred to above hydrochlorides are obtained which are suitably recrystallized from acetone or from absolute alcohol after the addition of dry ether.

*Examples:*

I. *Benzyl-benezoylecgonine.*—10.0 grams of anhydrous benzoylecgonine were carefully ground in a mortar with 5 cu. cm. benzoylchloride. The mixture was thereupon heated to 110° C. in a closed tube. The mass first melted down to a viscid liquid which after about one hour commenced to separate some crystals. After four hours heating the liquid was completely solidified and a sample was found to be soluble in little water. After cooling and pulverization the excess of benzylchloride was removed by boiling the mass with dry ether two or three times. The mass was thereupon dissolved in the smallest possible quantity of boiling acetone. On cooling, the hydrochloride of benzyl-benzoylecgonine was separated out in beautiful crystals having a melting point of 123°. The output of pure recrystallized hydrochloride was 11.0 grams corresponding to about 80 per cent of the theoretical output.

The hydrochloride was very readily dissolved in water, ethyl alcohol and methyl alcohol, readily soluble in warm acetone, fairly readily soluble in cold acetone and difficulty soluble in methylal and benzol and nearly insoluble in ether and petroleum ether. The free benzyl-benzoylecgonine was produced by precipitating an aqueous solution of the hydrochloride with ammonia or soda. A viscid oil was obtained which was readily soluble in the common organic solvents, but insoluble in water.

A solution in absolute alcohol containing 2.04 grams in 100 cu. cm. rotated the beam of polarized light in a 2 dcm. tube 1.10° to the left corresponding to:

$$[\alpha]_D = -26.97.$$

The ester as well as its hydrochloride were found to possess excellent properties as local anæsthetics.

II. *Allyl-benzoylecgonine.*—5.0 grams of anhydrous benzoylecgonine were intimately mixed in a mortar with 4 cu. cm. of allyl iodide. The mixture was heated to 105° C. in a tube closed by melting the end of the tube, for a period of 4 hours. No fusion took place. The reaction product had a brown colour. It was fairly readily soluble in cold water and readily in hot water. The reaction product was dissolved in boiling alcohol. On cooling, 6.1 grams of a beautifully crystalline nearly colourless hydroiodide of allyl-benzoylecgonine were separated out. Melting point 180° C.

The free alkaloid was produced by dissolving the hydroiodide in water and adding soda solution. The alkaloid was separated out in the form of oil drops which after some hours standing solidified in a crystalline condition. By recrystallization from 50 per cent alcohol it was obtained in very beautiful crystals having a melting point of 92° C. The alkaloid was readily soluble in the common organic solvents but nearly insoluble in water.

A solution in absolute alcohol containing 1.50 grams in 100 cu. cm. rotated the beam of polarized light in a 2 dcm. tube 0.93° to the left corresponding to:

$$[\alpha]_D = -31.00.$$

The hydrochloride was produced by dissolving the free alkaloid in exactly the calculated proportion of absolute alcoholic hydrochloric acid and precipitating with dry ether. Hereby the hydrochloride at once separates in a solid condition. It was purified by dissolution in absolute alcohol and the addition of dry ether, whereupon the hydrochloride crystallized out. Melting point 176° C. In this manner from 10 grams of benzoylecgonine 8.2 grams of pure allyl-benzoylecgonine-hydrochloride were obtained corresponding to about 65 percent of the theoretical output.

A solution in absolute alcohol containing 1.391 grams in 100 cu. cm. rotated the beam of polarized light in a 2 dcm. tube 1.04° to the left corresponding to:

$$[\alpha]_D = -37.30.$$

The allyl-benzoylecgonine as well as its hydrochloride were found to be in possession of very good properties as local anæsthetics and to be more suitable than cocaine for several purposes, for example for ophthalmologic practise.

The above examples specifically describe only the production of benzyl- and allyl esters, but it will be understood that the described process can be used also for the production of other benzoyl-ecgonine esters with aromatic and unsaturated hydrocarbon radicals, as for example salicyl-benzoyl-ecgonine.

I claim:

1. As a new product a chemical compound comprising a benzoyl-ecgonine-ester-group in which a hydrogen atom of the carboxyl group in the ecgonine molecule has been replaced by a radical of a hydrocarbon in which the proportion of hydrogen to carbon is less than in the hydrocarbons of the methane series.

2. As a new product a chemical compound comprising a benzoyl-ecgonine-ester with an unsaturated hydrocarbon radical.

3. As a new product a chemical compound comprising a benzoyl-ecgonine-ester-group in which a hydrogen atom of the carboxyl group has been replaced by an allyl radical.

4. As a new product a substance comprising the hydrohalide of an ester as defined in claim 1.

5. As a new product a substance comprising the hydrochloride of an ester as defined in claim 1.

In testimony that I claim the foregoing as my invention, I have signed my name.

E. POULSSON.